US009526009B1

(12) United States Patent
Berionne et al.

(10) Patent No.: US 9,526,009 B1
(45) Date of Patent: Dec. 20, 2016

(54) PROTECTING DATA STORED ON A MOBILE COMMUNICATION DEVICE UTILIZING A PERSONAL IDENTIFICATION NUMBER CODE OF A UNIVERSAL INTEGRATED CIRCUIT CARD

(71) Applicant: QUALCOMM Incorporated, San Diego, CA (US)

(72) Inventors: Michele Berionne, San Diego, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/725,464

(22) Filed: May 29, 2015

(51) Int. Cl.
| | | |
|---|---|---|
| H04L 9/08 | (2006.01) | |
| H04L 9/32 | (2006.01) | |
| H04W 12/04 | (2009.01) | |
| H04W 12/08 | (2009.01) | |
| H04B 1/3816 | (2015.01) | |

(52) U.S. Cl.
CPC ........... *H04W 12/08* (2013.01); *H04B 1/3816* (2013.01)

(58) Field of Classification Search
CPC ...... H04W 12/02; H04W 12/08; H04W 12/08; H04W 12/00; H04M 1/66; H04L 9/08; H04L 9/32
USPC ................................................ 455/410, 411
See application file for complete search history.

(56) References Cited

U.S. PATENT DOCUMENTS

| | | | |
|---|---|---|---|
| 8,417,643 B2 | 4/2013 | Mardikar | |
| 9,276,748 B2* | 3/2016 | Wang | H04W 12/02 |
| 2012/0190354 A1* | 7/2012 | Merrien | H04W 4/001 |
| | | | 455/422.1 |
| 2013/0227646 A1 | 8/2013 | Haggerty et al. | |
| 2013/0331063 A1 | 12/2013 | Cormier et al. | |
| 2014/0335825 A1* | 11/2014 | Babbage | H04L 63/0853 |
| | | | 455/411 |
| 2015/0181422 A1* | 6/2015 | Rombouts | H04L 63/08 |
| | | | 380/270 |

FOREIGN PATENT DOCUMENTS

| | | |
|---|---|---|
| EP | 1469692 A2 | 10/2004 |
| EP | 2858393 A1 | 4/2015 |

OTHER PUBLICATIONS

International Search Report and Written Opinion—PCT/US2016/024774—ISA/EPO—Jun. 22, 2016.

* cited by examiner

Primary Examiner — Blane Jackson
(74) Attorney, Agent, or Firm — Procopio, Cory, Hargreaves & Savitch LLP (57) ABSTRACT

A method for protecting data on a mobile communication device, comprising: reading existing security data from a universal integrated circuit card (UICC) during a current (second) power cycle; and utilizing the existing security data to decrypt data stored to a mobile communication device during a previous (first) power cycle.

15 Claims, 9 Drawing Sheets

PROTECTING DATA STORED ON A MOBILE COMMUNICATION DEVICE UTILIZING A PERSONAL IDENTIFICATION NUMBER CODE OF A UNIVERSAL INTEGRATED CIRCUIT CARD

BACKGROUND

Data stored on a universal integrated circuit card (UICC) may be protected utilizing one or more personal identification number (PIN) codes configured by a user. For example, the UICC may store at least one network access application (NAA) that provides credentials (e.g., international mobile subscriber identity (IMSI)) for a mobile communication device to access a communication network on a corresponding subscription. In order to access the NAA, a user may be required to provide the correct PIN code for the UICC.

A duplicate of the contents of a UICC may be stored locally on a mobile communication device. Additionally, data (e.g., phonebook entries, evolved packet system (EPS) location information) that exceeds the storage capacity of the UICC may be stored locally on the mobile communication device. But while data stored on the UICC is protected using a PIN code, data that is stored locally on the mobile communication device may not be protected using the same PIN. As such, data stored locally on the mobile communication device may be vulnerable to unauthorized access.

SUMMARY

Apparatuses and methods for protecting data stored on a mobile communication device utilizing a PIN code of a UICC are provided.

According to the various embodiments, there is provided a method for protecting data on a mobile communication device. The method may include: reading existing security data from the UICC; and utilizing the existing security data to decrypt data stored to a mobile communication device during the previous power cycle.

According to the various embodiments, there is provided a mobile communication device. In some embodiments, the mobile communication device may include a storage unit and a control unit coupled to the storage unit.

The control unit may be configured to: read existing security data from a UICC during a current (second) power cycle; and utilize the existing security data to decrypt data stored on the storage unit during a previous (first) power cycle.

According to various embodiments, there is provided a mobile communication device. In some embodiments, the mobile communication device may include: means for reading existing security data from a UICC during a current (second) power cycle; and means for utilizing the existing security data to decrypt data stored to a mobile communication device during a previous (first) power cycle.

According to various embodiments, there is provided a non-transitory computer readable medium. In some embodiments, the non-transitory computer readable medium may have stored thereon instructions for causing one or more processors to perform operations comprising: reading existing security data from a UICC during a current (second) power cycle; and utilizing the existing security data to decrypt data stored to a mobile communication device during a previous (first) power cycle.

Other features and advantages of the present inventive concept should be apparent from the following description which illustrates by way of example aspects of the present inventive concept.

BRIEF DESCRIPTION OF THE DRAWINGS

Aspects and features of the present inventive concept will be more apparent by describing example embodiments with reference to the accompanying drawings, in which.

DETAILED DESCRIPTION

While a number of embodiments are described herein, these embodiments are presented by way of example only, and are not intended to limit the scope of protection. The apparatuses and methods described herein may be embodied in a variety of other forms. Furthermore, various omissions, substitutions, and changes in the form of the example apparatuses and methods described herein may be made without departing from the scope of protection.

Figure 1:
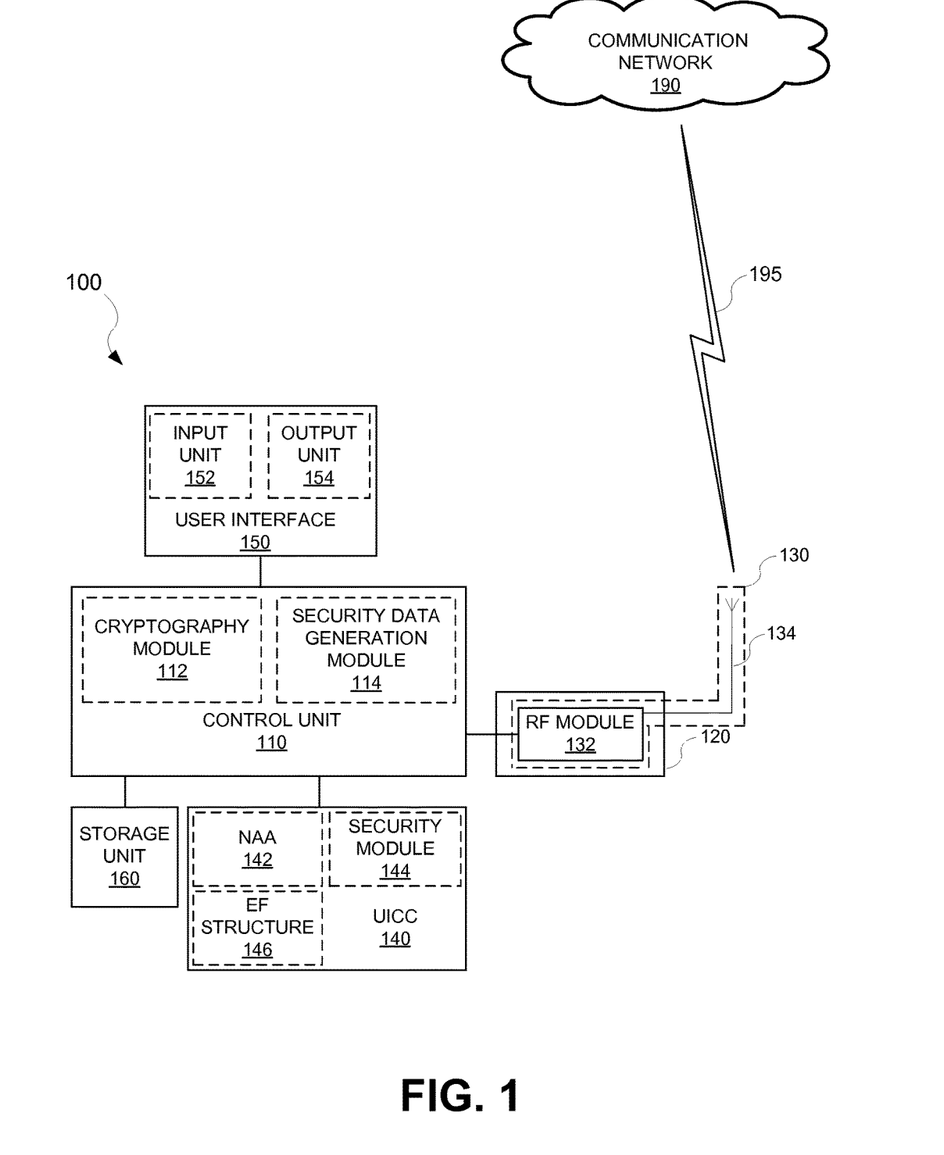
FIG. 1 is a block diagram illustrating a mobile communication device according to various embodiments.

FIG. 1 is a block diagram illustrating a mobile communication device 100 according to various embodiments. Referring to FIGS. 1, in various embodiments, the mobile communication device 100 may include a control unit 110, a communication unit 120, a UICC 140, a user interface 150, and a storage unit 160.

In various embodiments, the mobile communication device 100 may be any device capable of wirelessly communicating with one or more communication networks including, for example, but not limited to, a communication network 190. In various embodiments, the mobile communication device 100 may be, for example, but not limited to, a smartphone, a tablet PC, or a laptop computer.

In various embodiments, the communication unit 120 may include an RF chain 130. The RF chain 130 may include, for example, but not limited to, an RF module 132 and an antenna 134. Although the mobile communication device 100 is shown to include a single communication unit (e.g., the communication unit 120), a person of ordinary skill in the art can appreciate that the mobile communication device 100 may include additional communication units without departing from the scope of the present inventive concept.

A UICC (for example the UICC 140) in various embodiments may be configured with subscriber identity module (SIM) and/or universal SIM (USIM) applications, enabling access to Global System for Mobile communications (GSM) and/or Universal Mobile Telecommunications Systems (UMTS) networks. The UICC may also provide storage for a phone book and other applications. Alternatively, in a Code Division Multiple Access (CDMA) network, the UICC may be a UICC removable user identity module (R-UIM) or a CDMA subscriber identity module (CSIM) on a card. A UICC may have a CPU, ROM, RAM, EEPROM and I/O circuits. An Integrated Circuit Card Identity (ICCID) SIM serial number may be printed on the UICC for identification. However, a UICC may be implemented within a portion of memory of the mobile communication device 100, and thus need not be a separate or removable circuit, chip, or card.

A UICC used in various embodiments may store user account information, an International Mobile Subscriber Identity (IMSI), a set of SIM application toolkit (SAT) commands, and other network provisioning information, as well as provide storage space for phone book database of the user's contacts. As part of the network provisioning information, a UICC may store home identifiers (e.g., a System Identification Number (SID)/Network Identification Number (NID) pair, a Home Public Land Mobile Network (HPLMN) code, etc.) to indicate the UICC network operator provider.

In various embodiments, the UICC 140 may include an NAA 142. In various embodiments, the UICC 140 may associate the communication unit 120 with a subscription 195 on the communication network 190. As such, in various embodiments, the NAA 142 may be configured to provide network access credentials (NACs) for the mobile communication device 100 to access the communication network 190 on the subscription 195.

Although the UICC 140 is shown to include a single NAA (e.g., the NAA 142), a person having ordinary skills in the art can appreciate that the UICC 140 may include additional NAAs without departing from the scope of the present inventive concept. Access to different NAAs on the UICC 140 may require a same PIN code or different PIN codes without departing from the scope of the present inventive concept. For example, each of a plurality NAAs on the UICC 140 may be associated with an application identification number (AID) and may provide the NACs required for the mobile communication device 100 to access the communication network 190 (or a different communication network) on the subscription 195 (or a different subscription).

In various embodiments, the UICC 140 may further include a security module 144 and an elementary file (EF) structure 146. In various embodiments, the security module 144 may be configured to validate one or more PIN codes required to access the UICC 140. Additionally, in various embodiments, the security module 144 may be configured to generate security data (e.g., key, counter value, salt value) that may be used to protect at least a portion of data stored to the mobile communication device (e.g., in the storage unit 160). In various embodiments, the EF structure 146 may be configured to store one or more EFs including, for example, but not limited to, an EF that includes security data generated by the security module 144.

Although the mobile communication device 100 is shown to include a single UICC (e.g., the UICC 140), a person having ordinary skill in the art can appreciate that the mobile communication device 100 may include additional UICCs without departing from the scope of the present inventive concept. Additional UICCs may associate the communication unit 120 (or another communication unit) with the communication network 190 (or a different communication network) on the subscription 195 (or a different subscription) without departing from the scope of the present inventive concept.

In various embodiments, the communication network 190 may implement a radio access technology (RAT), including, for example, but not limited to Wideband CDMA (WCDMA), GSM, Long Term Evolution (LTE), and Time Division-Synchronous Code Division Multiple Access (TD-SCDMA).

In various embodiments, the user interface 150 may include an input unit 152. In various embodiments, the input unit 152 may be configured to receive user inputs that include, for example, but not limited to, one or more PIN codes for the UICC 140. In some embodiments, the input unit 152 may be, for example, but not limited to, a keyboard or a touch panel. In various embodiments, the user interface 150 may include an output unit 154. In some embodiments, the output unit 154 may be, for example, but not limited to, a liquid crystal display (LCD) or a light emitting diode (LED) display. A person of ordinary skill in the art will appreciate that other types or forms of input and output units may be used without departing from the scope of the present inventive concept.

In various embodiments, the control unit 110 may be configured to control the overall operation of the mobile communication device 100 including protecting data that may be stored to the mobile communication device 100 (e.g., the storage unit 160). In various embodiments, the control unit 110 may be, for example, but not limited to, a microprocessor (e.g., general-purpose processor, baseband modem processor, etc.) or a microcontroller.

In various embodiments, the control unit 110 may include a cryptography module 112 configured to encrypt and/or decrypt at least a portion of the data stored to the mobile communication device 100 (e.g., the storage unit 160).

In various embodiments, the control unit 110 may further include a security data generation module 114 configured to generate security data (e.g., key, counter value, salt value) utilized by the cryptography module 112 to encrypt and/or decrypt data stored to the mobile communication device 100.

In various embodiments, the storage unit 160 may be configured to store application programs, application data, and user data. For example, a duplicate of at least a portion of the data stored on the UICC 140, data exceeding the storage capacity of the UICC 140, and/or data that would otherwise be stored on the UICC 140 may be stored to the storage unit 160. In various embodiments, at least some of the application programs stored in the storage unit 160 may be executed by the control unit 110 for the operation of the mobile communication device 100.

In various embodiments, the control unit 110 may be configured to access security data stored on the UICC 140 (e.g., as part of an EF in the EF structure 146) and utilize the security data to encrypt and/or decrypt data stored to the mobile communication device 100 (e.g., the storage unit 160). For example, the control unit 110 (e.g., the cryptography module 112) may be configured to utilize the security data to encrypt and/or decrypt a duplicate of at least a portion of the data stored on the UICC 140 and/or data from the UICC 140 that exceeds a storage capacity of the UICC 140.

In some embodiments, security data utilized to encrypt and/or decrypt data stored to the mobile communication device 100 may be generated by the control unit 110 (e.g., the security data generation module 114) but stored on the UICC 140 (e.g., as part of an EF in the EF structure 146). In other embodiments, security data may be generated by the UICC 140 (e.g., the security module 144) and stored on the UICC 140 (e.g., as part of an EF in the EF structure 146).

In some embodiments, security data utilized to encrypt and/or decrypt data stored to the mobile communication device 100 may change across power cycles. During a current (second) power cycle, security data that is generated during a previous (first) power cycle may be discarded (e.g., overwritten with security data generated during the current (second) power cycle) prior to a next (third) power cycle. A power cycle may be a period of time between powering on and powering off the mobile communication device 100 and/or the UICC 140. For example, when the mobile communication device 100 enters airplane mode, the UICC 140 may be powered off while the mobile communication device 100 may remain powered on. A power cycle may also be initiated as a result of a UICC swap where a UICC (e.g., the UICC 140) is removed and a new UICC is installed without powering off the mobile communication device 110. Alternately, a power cycle may be initiated when the UICC 140 triggers a refresh and re-initializes UICC 140 in whole or in part (e.g., the NAA 142).

In other embodiments, security data may be retained across power cycles. For example, security data that is generated during a previous (first) power cycle may remain on the UICC 140 (e.g., as part of an EF in the EF structure 146) through the current (second) power cycle and may be utilized during a next (third) power cycle.

Figure 2:
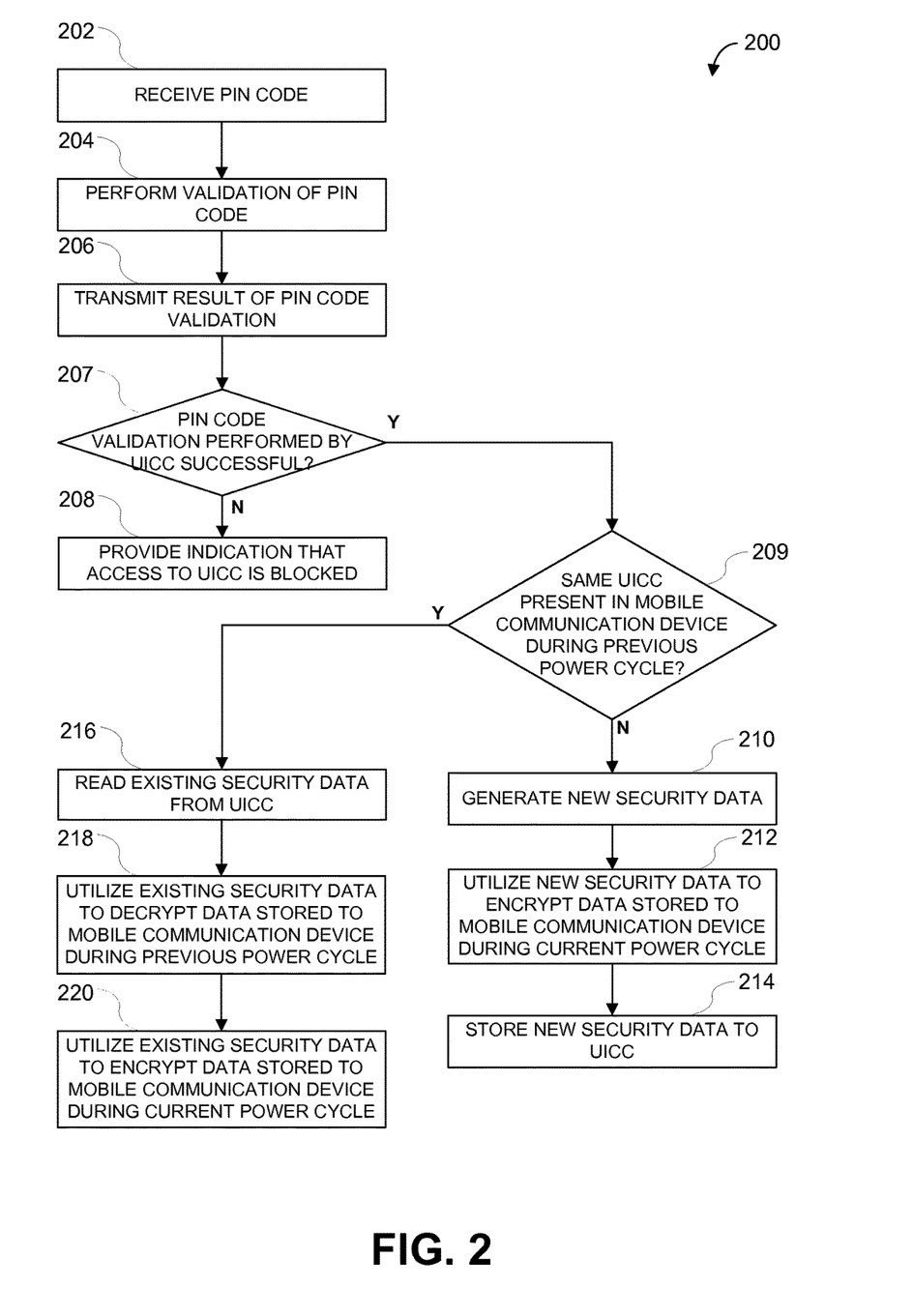
FIG. 2 is a flowchart illustrating a process for protecting data according to various embodiments.

FIG. 2 is a flowchart illustrating a process 200 for protecting data according to various embodiments. Referring to FIGS. 1 and 2, the UICC 140 may receive a PIN code (202). For example, when the mobile communication device 100 is powered up and/or when the UICC 140 is initially installed in the mobile communication device 100, a user may enter a PIN code for the UICC 140 (e.g., via the input unit 152). The mobile communication device 100 (e.g., the control unit 110) may transmit the PIN code entered by the user to the UICC 140.

The UICC 140 may perform a validation of the PIN code (204). For example, the UICC 140 (e.g., the security module 144) may validate the PIN code by comparing the PIN code entered by the user to a correct PIN code previously configured by the user and stored on the UICC 140.

The UICC 140 may transmit a result of the PIN code validation to the control unit 110 (206). For example, the user may be permitted one or more attempts to enter a correct PIN code for the UICC 140. If the PIN code entered by the user is successfully validated by the UICC 140, the UICC 140 may transmit an indication of a successful PIN code validation to the control unit 110. Alternately, if the user is unable to enter a correct PIN code for the UICC 140 after a certain number of attempts, the UICC 140 may transmit an indication that the PIN code is not successfully validated to the control unit 110.

The control unit 110 may determine whether the PIN code validation performed by the UICC 140 is successful (207). For example, the control unit 110 may determine whether the PIN code validation is successful based on a result of the PIN code validation received from the UICC 140. If the control unit 110 determines that the PIN code validation performed by the UICC 140 is not successful (207-N), the control unit 110 may provide an indication that access to the UICC 140 is blocked (208).

Alternately, if control unit 110 determines that the PIN code validation performed by the UICC 140 is successful (207-Y), the control unit 110 may determine whether the UICC 140 is a same UICC present in the mobile communication device 100 during a previous (first) power cycle (209). For example, the control unit 110 may compare an integrated circuit card ID (ICCID) of the UICC 140 with an ICCID stored on the mobile communication device 100 (e.g., the storage unit 160) for a UICC that was present in the mobile communication device 100 during a previous (first) power cycle.

If the control unit 110 determines that the UICC 140 is not the same UICC present in the mobile communication device 100 during the previous (first) power cycle (209-N), the control unit 110 may generate new security data (210). For example, in response to a determination that the UICC 140 is not the same UICC that was present in the mobile communication device 100 during the previous (first) power cycle, the control unit 110 (e.g., the security data generation module 114) may generate new security data for the UICC 140 including, for example, but not limited to, one or more keys, counter values, and salt values. Alternately, the control unit 110 may generate new security data by causing the UICC 140 (e.g., the security module 144) to generate new security data for the UICC 140 including, for example, but not limited to, one or more keys, counter values, salt values.

The control unit 110 may utilize the new security data to encrypt at least a portion of the data stored to the mobile communication device 100 during a current (second) power cycle (212). For example, the control unit 110 may utilize the new security data (e.g., key, counter value, salt value) to encrypt data stored to the mobile communication device 100 (e.g., the storage unit 160) from the UICC 140, including, for example, but not limited to, a duplicate of at least a portion of the data stored on the UICC 140 and/or data that exceeds a storage capacity of the UICC 140.

The control unit 110 may store the new security data to the UICC 140 (214). For example, the security data (e.g., key, counter value, salt value) generated by the control unit 110 (e.g., the security data generation module 114) may be stored only on the UICC 140 (e.g., as part of an EF in the EF structure 146) but not locally on the mobile communication device 100.

Alternately, the control unit 110 may determine that the UICC 140 is the same UICC present in the mobile communication device 100 during the previous (first) power cycle (209-Y). For example, the UICC 140 may not have changed between a previous (first) and a current (second) power cycle. As such, the control unit 110 may read existing security data from the UICC 140 (216). For example, the control unit 110 may read the existing security data (e.g., key, counter value, salt value) for the UICC 140 stored as part of an EF in the EF structure 146 of the UICC 140.

The control unit 110 may utilize the existing security data to decrypt data stored to the mobile communication device 100 during the previous (first) power cycle (218). For example, the control unit 110 (e.g., the cryptography module 112) may utilize the security data stored on the UICC 140 (e.g., as part of an EF in the EF structure 146) to decrypt a duplicate of at least a portion of the data stored on the UICC 140 and/or data exceeding the storage capacity of the UICC 140.

The control unit 110 may utilize the existing security data to encrypt data stored to the mobile communication device 100 during the current (second) power cycle (220). For example, the control unit 110 (e.g., the cryptography module 112) may utilize the security data stored on the UICC 140 (e.g., as part of an EF in the EF structure 146) to encrypt a duplicate of at least a portion of the data stored on the UICC 140 and/or data exceeding the storage capacity of the UICC 140.

A person having ordinary skill in the art can appreciate that at least some of the operations described with respect to the process 200 may be performed in a different order without departing from the scope of the present inventive concept.

Figure 3:
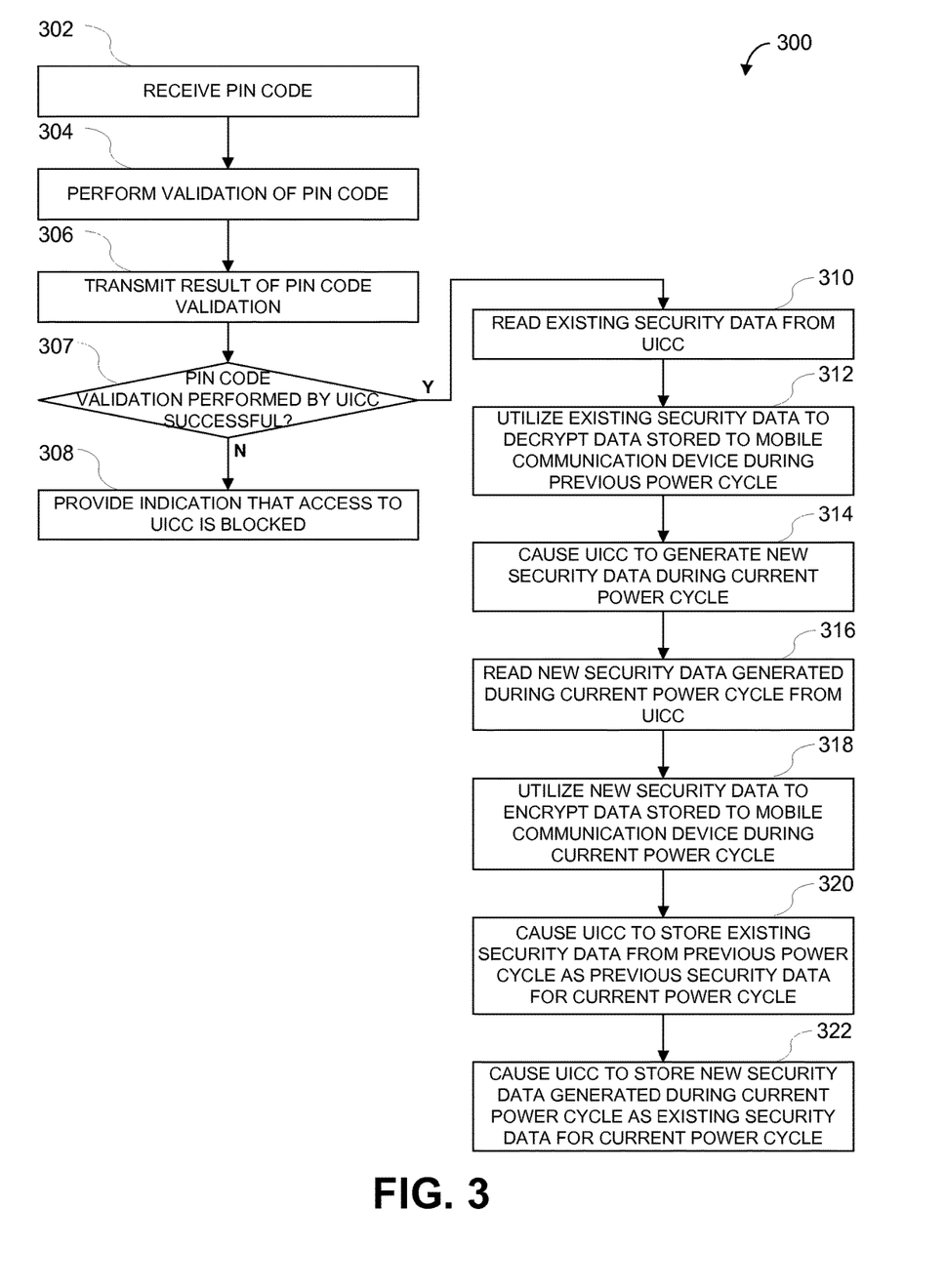
FIG. 3 is a flowchart illustrating a process for protecting data according to various embodiments.

FIG. 3 is a flowchart illustrating a process 300 for protecting data according to various embodiments. Referring to FIGS. 1 and 3, the UICC 140 may receive a PIN code (302). For example, when the mobile communication device 100 is powered up and/or when the UICC 140 is initially installed in the mobile communication device 100, a user may enter a PIN code for the UICC 140 (e.g., via the input unit 152). The mobile communication device 100 (e.g., the control unit 110) may transmit the PIN code entered by the user to the UICC 140.

The UICC 140 may perform a validation of the PIN code (304). For example, the UICC 140 (e.g., the security module 144) may validate the PIN code by comparing the PIN code entered by the user to a correct PIN code previously configured by the user and stored on the UICC 140.

The UICC 140 may transmit a result of the PIN code validation to the control unit 110 (306). For example, the user may be permitted a certain number of attempts to enter a correct PIN code for the UICC 140. If the PIN code entered by the user is successfully validated by the UICC 140, the UICC 140 may transmit an indication of a successful PIN code validation to the control unit 110. Alternately, if the user is unable to enter a correct PIN code for the UICC 140 after a certain number of attempts, the UICC 140 may transmit an indication that the PIN code is not successfully validated to the control unit 110.

The control unit 110 may determine whether the PIN code validation performed by the UICC 140 is successful (307). For example, the control unit 110 may determine whether the PIN code validation performed by the UICC 140 is successful based on the result of the PIN code validation received from the UICC 140.

If the control unit 110 determines that the PIN code validation performed by the UICC 140 is not successful (307-N), the control unit 110 may provide an indication that access to the UICC 140 is blocked (308). For example, access to the contents of the UICC 140 may be blocked if the user is unable to provide a correct PIN code for the UICC 140. As such, the control unit 110 may provide an indication (e.g., via the output unit 154) that access to the UICC 140 is blocked.

Alternately, if the control unit 110 determines that the PIN code validation performed by the UICC 140 is successful (307-Y), the control unit 110 may read existing security data (i.e., security data that was generated as new security data in the previous (first) power cycle) from the UICC 140 (310). The existing security data may be, for example, but not limited to, one or more keys, counter values, and salt values generated by the UICC 140 (e.g., the security module 144) during a previous (first) power cycle.

The control unit 110 may utilize the existing security data to decrypt at least a portion of data that was stored to the mobile communication device 100 during the previous (first) power cycle (312). For example, during a current (second) power cycle, the control unit 110 (e.g., the cryptography module 112) may utilize the existing security data (e.g., key, counter value, salt value) generated during the previous (first) power cycle to decrypt a duplicate of at least a portion of the data stored on the UICC 140 and/or data exceeding the storage capacity of the UICC 140.

The control unit 110 may cause the UICC 140 to generate new security data during a current (second) power cycle (314). For example, during the current (second) power cycle, the UICC 140 (e.g., the security module 144) may generate new security data including, for example, but not limited to, one or more keys, counter values, and salt values.

The control unit 110 may read the new security data generated during the current (second) power cycle from the UICC 140 (316) and utilize the new security data to encrypt at least a portion of data that is stored to the mobile communication device 100 during the current (second) power cycle (318). For example, the control unit 110 (e.g., the cryptography module 112) may utilize the new security data (e.g., key, counter value, salt value) generated during the current (second) power cycle to encrypt a duplicate of at least a portion of the data stored on the UICC 140 and/or data exceeding the storage capacity of the UICC 140.

The control unit 110 may cause the UICC 140 to store the existing security data from the previous (first) power cycle as previous security data for the current (second) power cycle (320). For example, the existing security data from the previous (first) power cycle (i.e., the security data that was generated as new security data during the previous (first) power cycle) may be stored as previous security data for the current (second) power cycle. During the current (second) power cycle, storing the existing security data from the previous (first) power cycle as previous security data may overwrite security data that was stored as previous security data (i.e., security data that was generated during a power cycle prior to the previous (first) power cycle) during the previous (first) power cycle. As such, data that was encrypted utilizing the security data that was stored as previous security data during the previous (first) power cycle may be inaccessible after the current (second) power cycle (e.g., during a next (third) power cycle subsequent to the current (second) power cycle).

The control unit 110 may cause the UICC 140 to store the new security data that is generated during the current (second) power cycle as existing security data for the current (second) power cycle (322). For example, the control unit 110 may cause the UICC 140 to store the new security data generated during the current (second) power cycle as existing security data in place of the existing security data, which was generated during the previous (first) power cycle.

Thus, during a next (third) power cycle, the control unit 110 may similarly store the security data that had been generated during the current (second) power cycle as previous security data. During the next (third) power cycle, storing security data that had been generated during the current (second) power cycle as previous security data may overwrite the previous security data for the current (second) power cycle, which is existing security data from the previous (first) power cycle. Overwriting the existing security data from the previous (first) power cycle (i.e., the security data that was generated during the previous (first) power cycle) during the next (third) power cycle may render stale data, which was stored to the mobile communication device 100 during the previous (first) power cycle, inaccessible after the next (third) power cycle.

A person having ordinary skills in the art can appreciate that at least some of the operations described with respect to the process 300 may be performed in a different order without departing from the scope of the present inventive concept.

Figure 4:
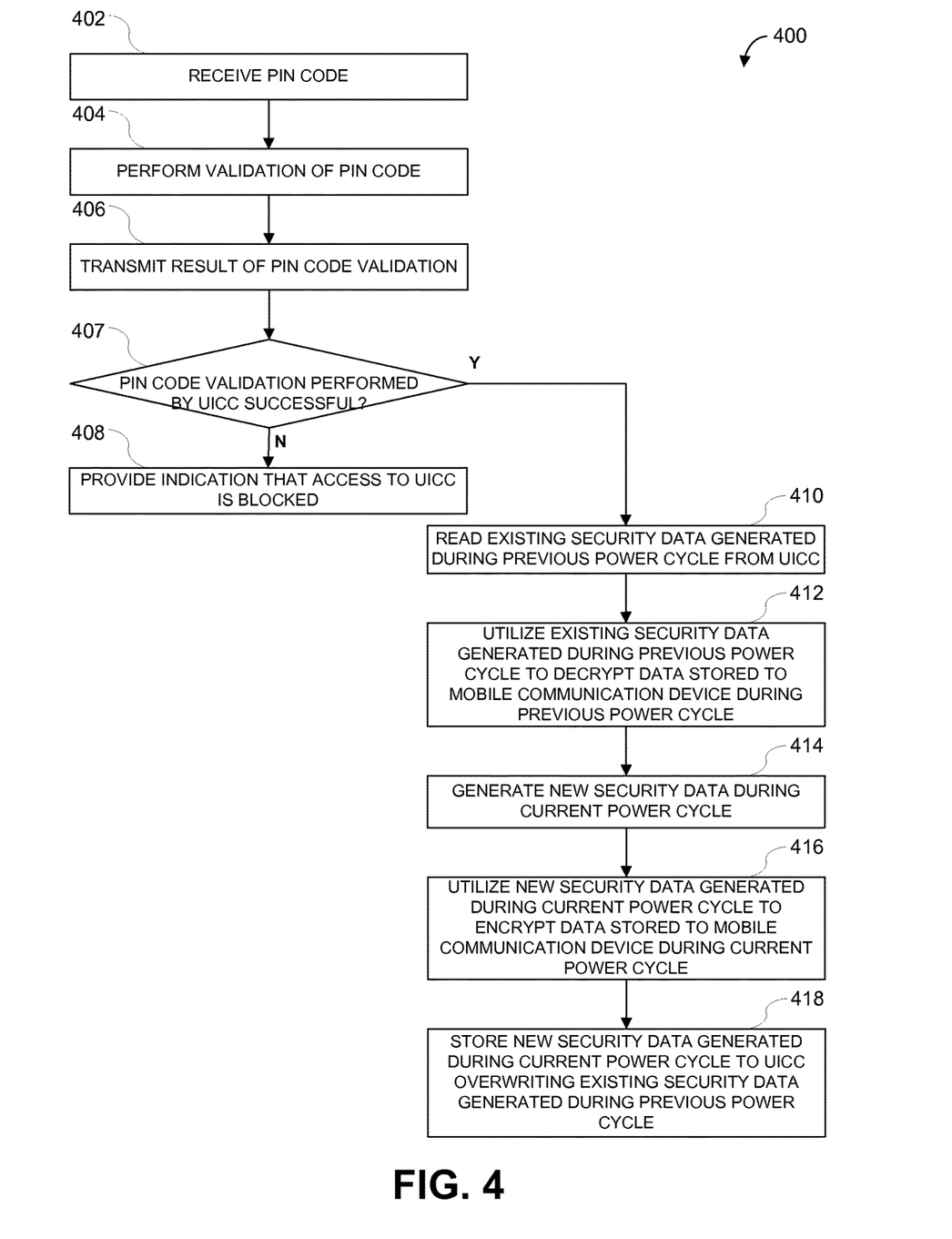
FIG. 4 is a flowchart illustrating a process for protecting data according to various embodiments.

FIG. 4 is a flowchart illustrating a process 400 for protecting data according to various embodiments. Referring to FIGS. 1 and 4, the UICC 140 may receive a PIN code (402). For example, when the mobile communication device 100 is powered up and/or when the UICC 140 is initially installed in the mobile communication device 100, a user may enter a PIN code for the UICC 140 (e.g., via the input unit 152). The mobile communication device 100 (e.g., the control unit 110) may transmit the PIN code entered by the user to the UICC 140.

The UICC 140 may perform a validation of the PIN code (404). For example, the UICC 140 (e.g., the security module 144) may validate the PIN code by comparing the PIN code entered by the user to a correct PIN code previously configured by the user and stored on the UICC 140.

The UICC 140 may transit a result of the PIN code validation to the control unit 110 (406). For example, the user may be permitted one or more attempts to enter a correct PIN code for the UICC 140. If the PIN code entered by the user is successfully validated by the UICC 140, the UICC 140 may transmit an indication of a successful PIN code validation to the control unit 110. Alternately, if the user is unable to enter a correct PIN code for the UICC 140 after a certain number of attempts, the UICC 140 may transmit an indication that the PIN code is not successfully validated to the control unit 110.

The control unit 110 may determine whether the PIN code validation performed by the UICC 140 is successful (407). For example, the control unit 110 may determine whether the PIN code validation is successful based on a result of the PIN code validation received from the UICC 140.

If the control unit 110 determines that the PIN code validation performed by the UICC 140 is not successful (407-N), the control unit 110 may provide an indication that access to the UICC 140 is blocked (408). For example, access to the contents of the UICC 140 may be blocked if the user is unable to enter a correct PIN code for the UICC 140. As such, the control unit 110 may provide an indication (e.g., via the output unit 154) that access to the UICC 140 is blocked.

Alternately, if the control unit 110 determines that PIN code validation performed by the UICC 140 is successful (407-Y), the control unit 110 may read existing security data generated during a previous (first) power cycle from the UICC 140 (410). For example, existing security data that was generated during a previous (first) power cycle may have been stored on the UICC 140 as part of an EF in an EF structure 146. In response to a successful verification of the UICC PIN code by the UICC 140 during the current (second) power cycle, the control unit 110 may read the existing security data, which was generated during the previous (first) power cycle from the UICC 140.

The control unit 110 may utilize the existing security data, which was generated during the previous (first) power cycle, to decrypt at least a portion of data that was stored to the mobile communication device 100 during the previous (first) power cycle (412). For example, during the current (second) power cycle, the control unit 110 (e.g., the cryptography module 112) may utilize the existing security data (e.g., key, counter value, salt value), which was generated during the previous (first) power cycle, to decrypt a duplicate of at least a portion of the data stored on the UICC 140 and/or data exceeding the storage capacity of the UICC 140.

The control unit 110 may generate new security data during the current (second) power cycle (414). For example, the control unit 110 (e.g., the security data generation module 114) may generate new security data including, for example, but not limited to, one or more keys, counter values, and salt values during the current (second) power cycle.

The control unit 110 may utilize the new security data (that is generated during the current (second) power cycle) to encrypt at least a portion of data stored to the mobile communication device 100 during the current (second) power cycle (416). For example, the control unit 110 may utilize the new security data (e.g., key, counter value, salt value) generated during the current (second) power cycle to encrypt a duplicate of at least a portion of the data stored on the UICC 140 and/or data that exceeds a storage capacity of the UICC 140 may be stored to the mobile communication device 100.

The control unit 110 may store the new security data that is generated during the current (second) power cycle to the UICC 140 overwriting the existing security data, which was generated during the previous (first) power cycle, (418). For example, the control unit 110 may store the new security data (e.g., key, counter value, salt value) that is generated during the current (second) power cycle to the UICC 140 as part of an EF in the EF structure 146. Storing the new security data that is generated during the current (second) power cycle to the UICC 140 may overwrite the existing security data, which was generated during the previous (first) power cycle and stored on the UICC 140 (e.g., as part of the EF in the EF structure 146). By overwriting the existing security data, which was generated during the previous (first) power cycle, stale data stored to the mobile communication device 100 during the previous (first) power cycle may be rendered inaccessible during a next (third) power cycle that is subsequent to the current (second) power cycle.

A person having ordinary skills in the art can appreciate that at least some of the operations described with respect to the process 400 may be performed in a different order without departing from the present inventive concept.

Figure 5A:
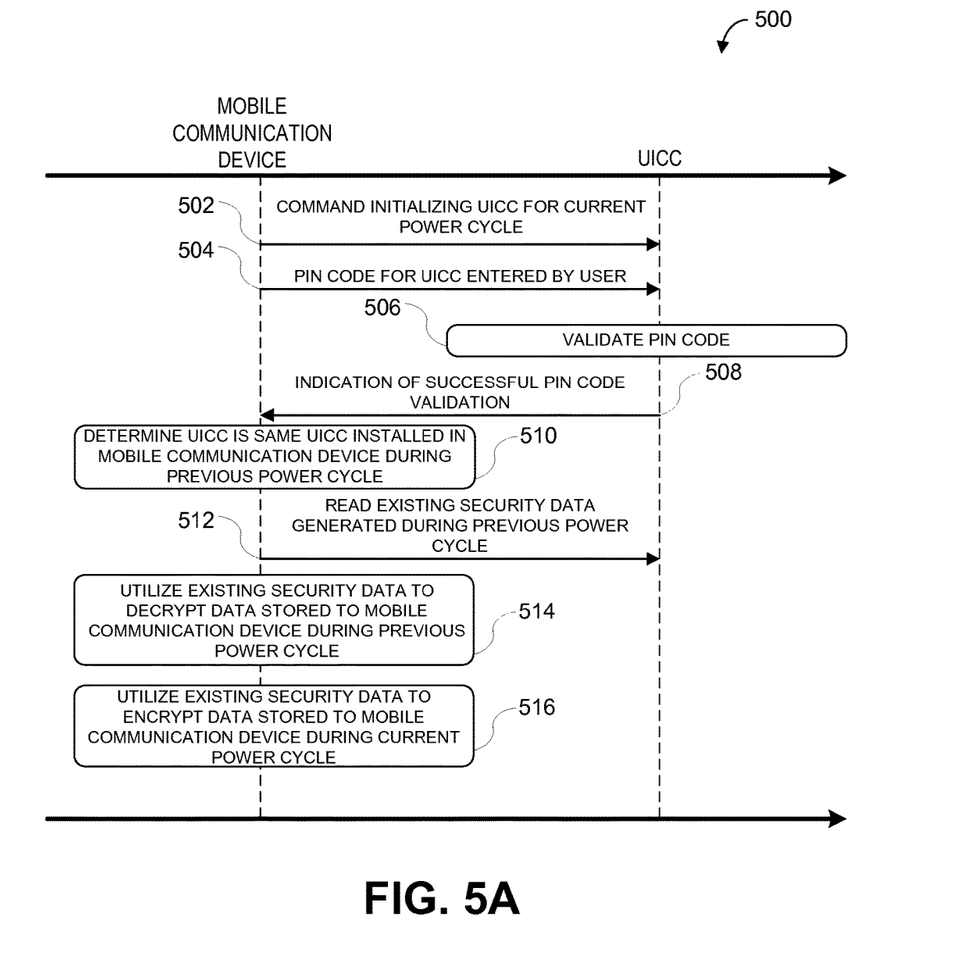
FIG. 5A is an event diagram illustrating a sequence for protecting data according to various embodiments.

FIG. 5A is an event diagram illustrating a sequence 500 for protecting data according to various embodiments. Referring to FIGS. 1, 2, and 5A, in the sequence 500, the mobile communication device 100 may transmit to the UICC 140 a command initializing the UICC 140 for a current (second) power cycle (502). For example, a current (second) power cycle may be initiated when a user powers on the mobile communication device 100. Upon initiating the current (second) power cycle, the mobile communication device 100 may trigger an initialization of the UICC 140.

The mobile communication device 100 may transmit to the UICC 140 a PIN code for the UICC 140 entered by a user (504). For example, during the current (second) power cycle, a user may be prompted (e.g., via the output unit 154) to enter one or more PIN codes in order to access the UICC 140. The user may enter the one or more PIN codes required to access the UICC 140 via the input unit 152.

In response to receiving a PIN code from the mobile communication device 100, the UICC 140 may validate the PIN code entered by the user (506). For example, the UICC 140 may compare the PIN code entered by the user to a correct PIN code previously configured by the user and stored at the UICC 140. The UICC 140 may transmit an indication of a successful PIN code validation to the mobile communication device 100 (508).

In response to the indication of the successful PIN code validation by the UICC 140, the mobile communication device 100 may determine that the UICC 140 is a same UICC present in the mobile communication device 100 during a previous (first) power cycle (510). For example, the mobile communication device 100 may determine an ICCID of the UICC 140 matches an ICCID stored on the mobile communication device 100 (e.g., the storage unit 160) for a UICC present in the mobile communication device 100 during a previous (first) power cycle.

In response to determining that the UICC 140 is a same UICC present in the mobile communication device 100 during the previous (first) power cycle, the mobile communication device 100 may read existing security data that was generated during a previous (first) power cycle from the UICC 140 (512). For example, the mobile communication device 100 may read existing security data including, for example, but not limited to, one or more keys, counter values, and salt values from an EF in the EF structure 146.

The mobile communication device 100 may utilize the existing security data to decrypt data that was stored to the mobile communication device 100 during the previous (first) power cycle (514). For example, the mobile communication device 100 may utilize the existing security data (e.g., key, counter value, salt value) to decrypt a duplicate of at least a portion of the data stored on the UICC 140 and/or data that exceeds a storage capacity of the UICC 140 may be stored to the mobile communication device 100.

The mobile communication device 100 may utilize the existing security data to encrypt at least a portion of the data that is stored to the mobile communication device 100 during the current (second) power cycle (516). For example, during the current (second) power cycle, the mobile communication device 100 may utilize the existing security data to encrypt a duplicate of at least a portion of the data stored on the UICC 140 and/or data that exceeds a storage capacity of the UICC 140.

A person having ordinary skill in the art can appreciate that at least some of the operations described with respect to the sequence 500 may be performed in a different order without departing from a scope of the present inventive concept.

Figure 5B:
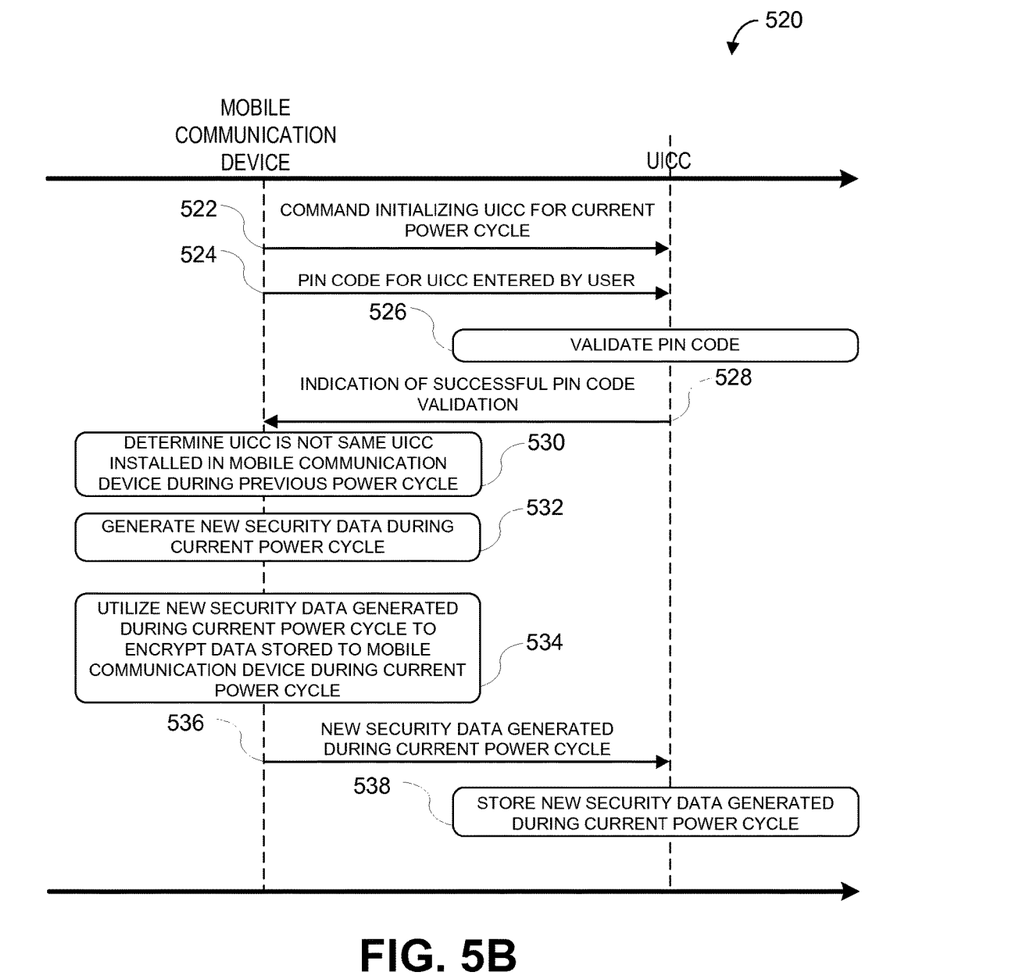
FIG. 5B is an event diagram illustrating a sequence for protecting data according to various embodiments.

FIG. 5B is an event diagram illustrating a sequence 520 for protecting data according to various embodiment. Referring to FIGS. 1, 2, 5A, and 5B, in the sequence 520, the mobile communication device 100 may transmit to the UICC 140 a command initializing the UICC 140 for a current (second) power cycle (522). For example, a current (second) power cycle may be initiated when a user powers on the mobile communication device 100. Upon initiating the current (second) power cycle, the mobile communication device 100 may trigger an initialization of the UICC 140.

The mobile communication device 100 may transmit to the UICC 140 a PIN code for the UICC 140 entered by a user (524). For example, during the current (second) power cycle, a user may be prompted (e.g., via the output unit 154) to enter one or more PIN codes in order to access the UICC 140. The user may enter the one or more PIN codes required to access the UICC 140 via the input unit 152.

In response to receiving a PIN code from the mobile communication device 100, the UICC 140 may validate the PIN code entered by the user (526). For example, the UICC 140 may compare the PIN code entered by the user to a correct PIN code previously configured by the user and stored on the UICC 140. The UICC 140 may transmit an indication of a successful PIN code validation to the mobile communication device 100 (528).

In response to the indication of the successful PIN code validation by the UICC 140, the mobile communication device 100 may determine that the UICC 140 is not a same UICC present in the mobile communication device 100 during a previous (first) power cycle (530). For example, the mobile communication device 100 may determine an ICCID of the UICC 140 does not match an ICCID stored on the mobile communication device 100 (e.g., the storage unit 160) for a UICC from a previous (first) power cycle.

In response to determining that the UICC 140 is not a same UICC present in the mobile communication device 100 during the previous (first) power cycle, the mobile communication device 100 may generate new security data during the current (second) power cycle (532). For example, the mobile communication device 100 may generate new security data including, for example, but not limited to, one or more keys, counter values, and salt values.

The mobile communication device 100 may utilize the new security data, which is generated during the current (second) power cycle, to encrypt at least a portion of the data stored to the mobile communication device 100 during the current (second) power cycle (534). For example, during the current (second) power cycle, the mobile communication device 100 may utilize the new security data to encrypt a duplicate of at least a portion of the data stored on the UICC 140 and/or data that exceeds a storage capacity of the UICC 140.

The mobile communication device 100 may transmit the new security data generated during the current (second) power cycle to the UICC 140 (536). For example, the mobile communication device 100 may transmit to the UICC 140, the new security data that includes, for example, but not limited to, one or more keys, counter values, and salt values. The UICC 140 may store the new security data, which is generated during the current (second) power cycle (538). For example, the new security data (e.g., key, counter value, salt value) generated during the current (second) power cycle may be stored on the UICC 140 (e.g., as part of an EF in the EF structure 146) and not on the mobile communication device 100.

A person having ordinary skill in the art can appreciate that at least some of the operations described with respect to the sequence 520 may be performed in a different order without departing from a scope of the present inventive concept.

Figure 5C:
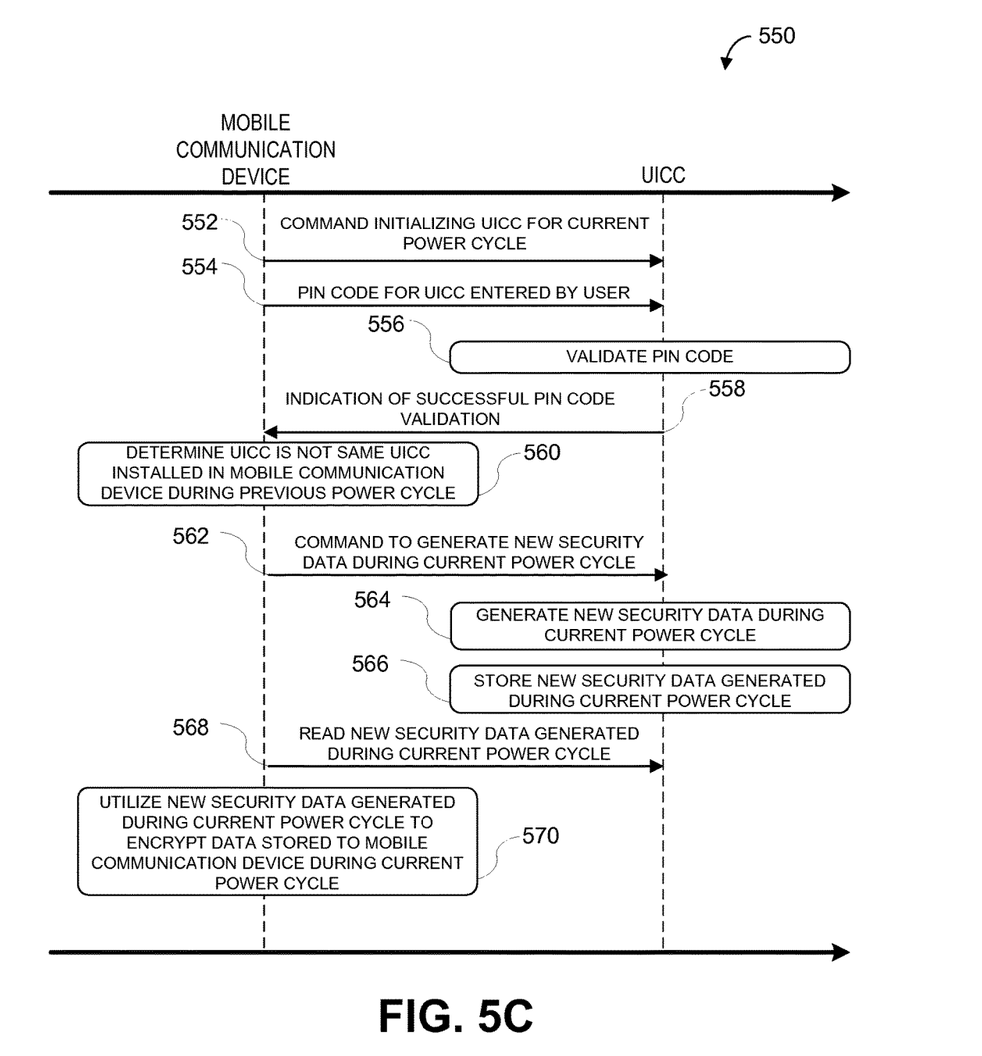
FIG. 5C is an event diagram illustrating a sequence for protecting data according to various embodiments.

FIG. 5C is an event diagram illustrating a sequence 550 for protecting data according to various embodiment. Referring to FIGS. 1, 2, and 5A-5C, in the sequence 550, the mobile communication device 100 may transmit to the UICC 140 a command initializing the UICC 140 for a current (second) power cycle (552). For example, a current (second) power cycle may be initiated when a user powers on the mobile communication device 100. Upon initiating the current (second) power cycle, the mobile communication device 100 may trigger an initialization of the UICC 140.

The mobile communication device 100 may transmit to the UICC 140 a PIN code for the UICC 140 entered by a user (554). For example, during the current (second) power cycle, a user may be prompted (e.g., via the output unit 154) to enter one or more PIN codes in order to access the UICC 140. The user may enter the one or more PIN codes required to access the UICC 140 via the input unit 152.

In response to receiving a PIN code from the mobile communication device 100, the UICC 140 may validate the PIN code entered by the user (556). For example, the UICC 140 may compare the PIN code entered by the user to a correct PIN code previously configured by the user and stored on the UICC 140. The UICC 140 may transmit an indication of a successful code validation to the mobile communication device 100 (558).

In response to the indication of the successful PIN code validation by the UICC 140, the mobile communication device 100 may determine that the UICC 140 is not a same UICC present in the mobile communication device 100 during a previous (first) power cycle (560). For example, the mobile communication device 100 may determine an ICCID of the UICC 140 does not match an ICCID stored on the mobile communication device 100 (e.g., the storage unit 160) for a UICC from a previous (first) power cycle.

In response to determining that the UICC 140 is not a same UICC present in the mobile communication device 100 during the previous (first) power cycle, the mobile communication device 100 may transmit a command to the UICC 140 to generate new security data during the current (second) power cycle (562). In response, the UICC 140 may generate new security data during the current (second) power cycle (564). For example, the UICC 140 (e.g., the security module 144) may generate during the current (second) power cycle new security data including, for example, but not limited to, one or more keys, counter values, and salt values. The UICC 140 may store the new security data (566). For example, the UICC 140 may store the new security data (e.g., key, counter value, salt value) as part of an EF in the EF structure 146.

The mobile communication device 100 may read the new security data, which is generated during the current (second) power cycle (568). The mobile communication device 100 may utilize the new security data, which is generated during the current (second) power cycle, to encrypt data stored to the mobile communication device 100 during the current (second) power cycle (572). For example, new security data (e.g., key, counter value, salt value), which is generated during the current (second) power cycle, may be utilized to encrypt a duplicate of at least a portion of the data stored on the UICC 140 and/or data that exceeds a storage capacity of the UICC 140.

A person having ordinary skill in the art can appreciate that at least some of the operations described with respect to the sequence 550 may be performed in a different order without departing from a scope of the present inventive concept.

Figure 6:
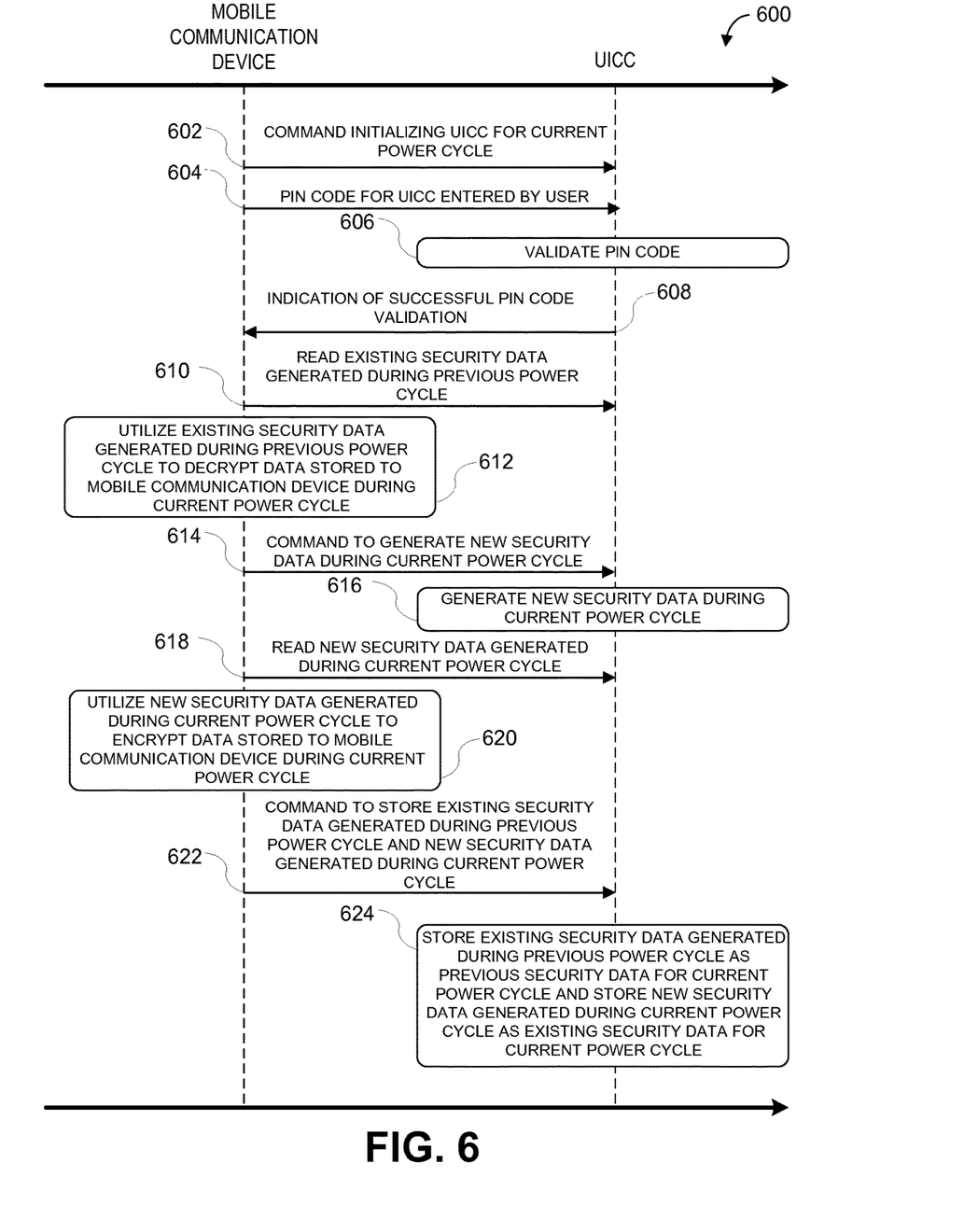
FIG. 6 is an event diagram illustrating a sequence for protecting data according to various embodiments.

FIG. 6 is an event diagram illustrating a sequence 600 for protecting data according to various embodiments. Referring to FIGS. 1, 3, and 6, in the sequence 600, the mobile communication device 100 may transmit to the UICC 140 a command initializing the UICC 140 for a current (second) power cycle (602). For example, a current (second) power cycle may be initiated when a user powers on the mobile communication device 100. Upon initiating the current (second) power cycle, the mobile communication device 100 may trigger an initialization of the UICC 140.

The mobile communication device 100 may transmit to the UICC 140 a PIN code for the UICC 140 entered by a user (604). For example, during the current (second) power cycle, a user may be prompted (e.g., via the output unit 154) to enter one or more PIN codes in order to access the UICC 140. The user may enter the one or more PIN codes required to access the UICC 140 via the input unit 152.

In response to receiving a PIN code from the mobile communication device 100, the UICC 140 may validate the PIN code entered by the user (606). For example, the UICC 140 may compare the PIN code entered by the user to a correct PIN code previously configured by the user and stored on the UICC 140. The UICC 140 may transmit an indication of a successful PIN code validation to the mobile communication device 100 (608).

In response to the indication of the successful PIN code validation by the UICC 140, the mobile communication device 100 may read existing security data that was generated during a previous (first) power cycle from the UICC 140 (610). For example, upon a successful PIN code validation by the UICC 140, the mobile communication device 100 may have access to one or more EFs in the EF structure 146 on the UICC 140. Existing security data (e.g., key, counter value, salt value), which was generated during the previous (first) power cycle, may be stored as part of an EF in the EF structure 146 on the UICC 140.

The mobile communication device 100 may utilize the existing security data, which was generated during the previous (first) power cycle, to decrypt data that was stored to the mobile communication device 100 during the previous (first) power cycle (612). For example, the mobile communication device 100 (e.g., the cryptography module 112) may utilize the existing security data (e.g., key, counter value, salt value), which was generated during the previous (first) power cycle, to decrypt a duplicate of at least a portion of the data stored on the UICC 140 and/or data that exceeds a storage capacity of the UICC 140.

The mobile communication device 100 may transmit a command to the UICC 140 to generate new security data during the current (second) power cycle (614). In response, the UICC 140 may generate new security data during the current (second) power cycle (616). For example, the UICC 140 (e.g., the security module 144) may generate new security data including, for example, but not limited to, one or more keys, counter values, and salt values.

The mobile communication device 100 may read the new security data, which is generated during the current (second) power cycle (618). The mobile communication device 100 may utilize the new security data, which is generated during the current (second) power cycle, to encrypt data stored to the mobile communication device 100 during the current (second) power cycle (620). For example, new security data (e.g., key, counter value, salt value), which is generated during the current (second) power cycle, may be utilized to encrypt a duplicate of at least a portion of the data stored on the UICC 140 and/or data that exceeds a storage capacity of the UICC 140.

The mobile communication device 100 may transmit a command to the UICC 140 to store the existing security data, which was generated during the previous (first) power cycle, and the new security data, which is generated during the current (second) power cycle (622). In response, the UICC 140 may store the existing security data, which was generated during the previous (first) power cycle, as previous security data for the current (second) power cycle and store the new security data, which is generated during the current (second) power cycle, as existing security data for the current (second) power cycle (624). Storing the existing security data from the previous (first) power cycle as previous security data during the current (second) power cycle may overwrite security data that was stored as previous security data (i.e., security data that was generated during a power cycle prior to the previous (first) power cycle) during the previous (first) power cycle. As such, data that was encrypted utilizing the security data that was stored as previous security data during the previous (first) power cycle may be inaccessible after the current (second) power cycle (e.g., during a next (third) power cycle subsequent to the current (second) power cycle).

During the next (third) power cycle, the UICC 140 may similarly store the security data that had been generated during the current (second) power cycle as previous security data. Storing the security data that had been generated during the current (second) power cycle as previous security data may overwrite the previous security data for the current (second) power cycle, which is existing security data from the previous (first) power cycle. Overwriting the existing security data from the previous (first) power cycle (i.e., security data that was generated during the previous (first)

power cycle) during the next (third) power cycle may render stale data, which was stored to the mobile communication device 100 during the previous (first) power cycle, inaccessible after the next (third) power cycle.

A person having ordinary skill in the art can appreciate that at least some of the operations described with respect to the sequence 600 may be performed in a different order without departing from the scope of the present inventive concept.

Figure 7:
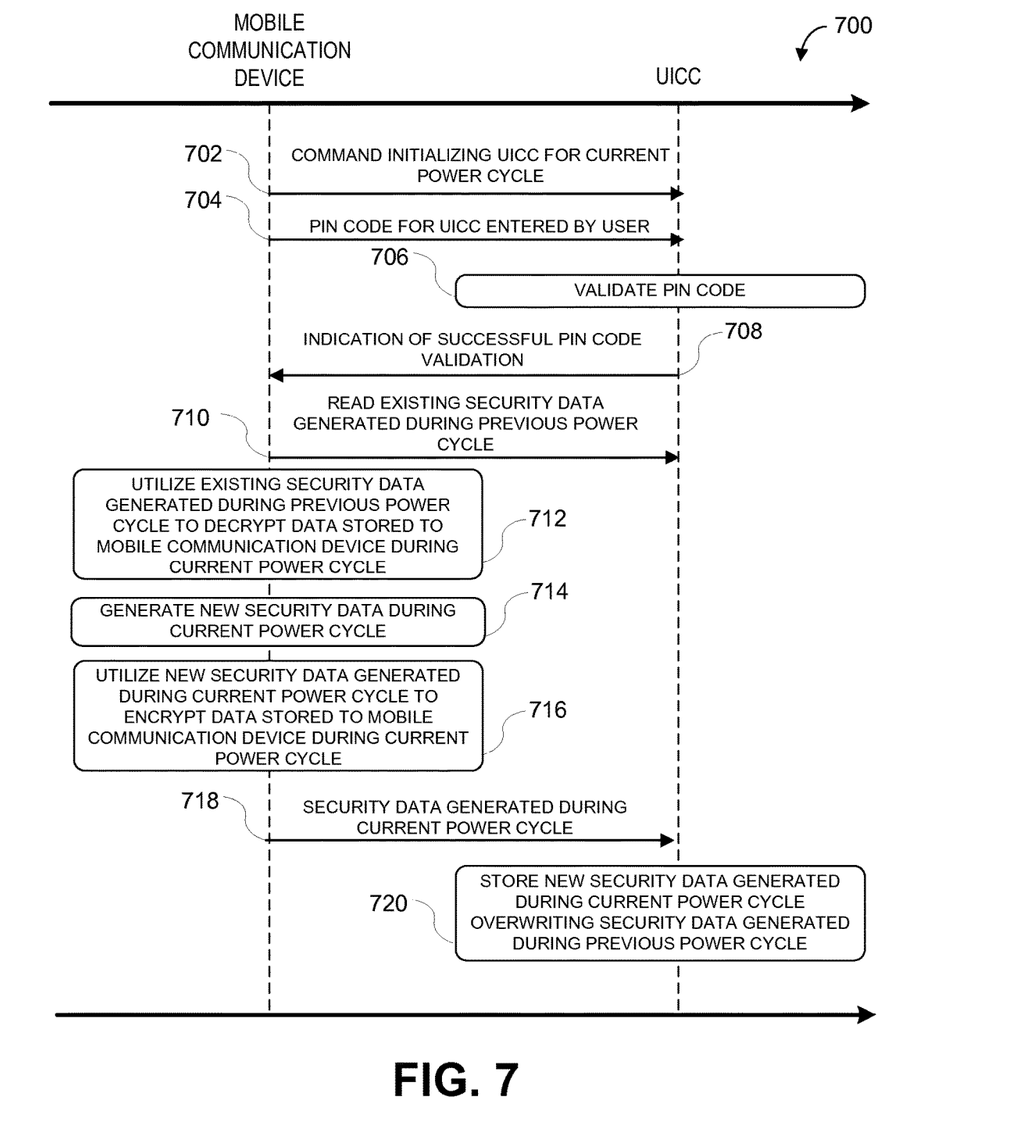
FIG. 7 is an event diagram illustrating a sequence for protecting data according to various embodiments.

FIG. 7 is an event diagram illustrating a sequence 700 for protecting data according to various embodiments. Referring to FIGS. 1, 4, and 7, in the sequence 700, the mobile communication device 100 may transmit to the UICC 140 a command initializing the UICC 140 for a current (second) power cycle (702). For example, a current (second) power cycle may be initiated when a user powers on the mobile communication device 100. Upon initiating the current (second) power cycle, the mobile communication device 100 may trigger an initialization of the UICC 140.

The mobile communication device 100 may transmit to the UICC 140 a PIN code for the UICC 140 entered by a user (704). For example, during the current (second) power cycle, a user may be prompted (e.g., via the output unit 154) to enter one or more PIN codes in order to access the UICC 140. The user may enter the one or more PIN codes required to access the UICC 140 via the input unit 152.

In response to receiving a PIN code from the mobile communication device 100, the UICC 140 may validate the PIN code entered by the user (706). For example, the UICC 140 may compare the PIN code entered by the user to a correct PIN code previously configured by the user and stored on the UICC 140. The UICC 140 may transmit an indication of a successful PIN code validation to the mobile communication device 100 (708).

In response to the indication of the successful PIN code validation by the UICC 140, the mobile communication device 100 may read existing security data that was generated during the previous (first) power cycle from the UICC 140 (710). For example, upon a successful PIN code validation by the UICC 140, the mobile communication device 100 may have access to one or more EFs in the EF structure 146 on the UICC 140. Existing security data (e.g., key, counter value, salt value), which was generated during the previous (first) power cycle may be stored as part of an EF in the EF structure 146 on the UICC 140.

The mobile communication device 100 may utilize the existing security data, which was generated during the previous (first) power cycle, to decrypt at least a portion of data that was stored to the mobile communication device 100 during the previous (first) power cycle (712). For example, the mobile communication device 100 (e.g., the cryptography module 112) may utilize the existing security data (e.g., key, counter value, salt value), which was generated during the previous (first) power cycle to decrypt a duplicate of at least a portion of the data stored on the UICC 140 and/or data that exceeds a storage capacity of the UICC 140.

The mobile communication device 100 may generate new security data during the current (second) power cycle (714). For example, the mobile communication device 100 (e.g., the security data generation module 114) may generate new security data during the current (second) power cycle including, for example, but not limited to, one or more keys, counter values, and salt values.

The mobile communication device 100 may utilize the new security data, which is generated during the current (second) power cycle, to encrypt data stored to the mobile communication device 100 during the current (second) power cycle (716). For example, new security data (e.g., key, counter value, salt value), which is generated during the current (second) power cycle, may be utilized to encrypt a duplicate of at least a portion of the data stored on the UICC 140 and/or data that exceeds a storage capacity of the UICC 140.

The mobile communication device 100 may transmit the new security data, which is generated during the current (second) power cycle, to the UICC 140 (718). For example, the mobile communication device 100 may store the new security data (e.g., key, counter value, salt value), which is generated during the current (second) power cycle, to the UICC 140 as part of an EF in the EF structure 146.

The UICC 140 may store the new security data, which is generated during the current (second) power cycle, overwriting the existing security data, which was generated during the previous (first) power cycle (720). For example, the UICC 140 may store the new security data (e.g., key, counter value, salt value), which is generated during the current (second) power cycle, as part of an EF in the EF structure 146. Storing the new security data may overwrite the existing security data that was generated and stored as part of the EF in the EF structure 146 during the previous (first) power cycle. As such, during a next (third) power cycle, the data that was stored to the mobile communication device 100 during the previous (first) power cycle (i.e., previous to the "current (second) power cycle," which precedes the "next (third) power cycle") and encrypted utilizing the existing security data, which generated during the previous (first) power cycle, may be rendered inaccessible.

A person having ordinary skill in the art can appreciate that at least some of the operations described with respect to the sequence 700 may be performed in a different order without departing from the scope of the present inventive concept.

The accompanying claims and their equivalents are intended to cover such forms or modifications as would fall within the scope and spirit of the protection. For example, the example apparatuses, methods, and systems disclosed herein may be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc., are not intended to limit the order of the operations; these words are simply used to guide the reader through the description of the methods. Further, any reference to claim elements in the singular, for example, utilizing the articles "a," "an," or "the" is not to be construed as limiting the element to the singular.

The various illustrative logical blocks, modules, circuits, and operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative logics, logical blocks, modules, and circuits described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electrically erasable programmable read-only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for protecting data on a mobile communication device, comprising:
   reading existing security data from a universal integrated circuit card (UICC) during a current (second) power cycle;
   utilizing the existing security data to decrypt data that was stored to the mobile communication device during a previous (first) power cycle;
   generating new security data during the current (second) power cycle;
   utilizing the new security data to encrypt data stored to the mobile communication device during the current (second) power cycle;
   causing the UICC to store the existing security data from the previous (first) power cycle as previous security data for the current (second) power cycle; and
   causing the UICC to store the new security data, which is generated during the current (second) power cycle, as existing security data for the current (second) power cycle by overwriting the existing security data that was stored to the UICC during the previous (first) power cycle,
   wherein overwriting the security data, which was stored to the UICC as the previous security data during the previous (first) power cycle, renders data stored to the mobile communication device during the previous (first) power cycle inaccessible during a next (third) power cycle subsequent to the current (second) power cycle.

2. The method of claim 1, wherein the existing security data comprises one or more of a key, a counter value, and a salt value.

3. The method of claim 1, further comprising:
   determining whether a personal identification number (PIN) code validation performed by the UICC is successful; and
   reading the existing security data from the UICC in response to determining that the PIN code validation performed by the UICC is successful.

4. The method of claim 1, wherein generating the new security data includes causing the UICC to generate the new security data.

5. The method of claim 4, further comprising reading the new security data generated during the current (second) power cycle from the UICC.

6. The method of claim 1, wherein data that was stored to the mobile communication device during the previous (first) power cycle was encrypted utilizing the security data that was stored as previous security data during the previous (first) power cycle.

7. The method of claim 1, further comprising:
   reading, from the UICC, the existing security data from the current (second) power cycle during a next (third) power cycle subsequent to the current (second) power cycle; and
   utilizing the existing security data from the current (second) power cycle to decrypt data that was stored to the mobile communication device during the current (second) power cycle.

8. A mobile communication device, comprising:
a storage unit; and
a control unit coupled to the storage unit, the control unit configured to:
read existing security data from a universal integrated circuit card (UICC) during a current (second) power cycle;
utilize the existing security data to decrypt data stored on the storage unit during a previous (first) power cycle;
generate new security data during the current (second) power cycle;
utilize the new security data to encrypt data stored to the mobile communication device during the current (second) power cycle;
cause the UICC to store the existing security data from the previous (first) power cycle as previous security data for the current (second) power cycle; and
cause the UICC to store the new security data, which is generated during the current (second) power cycle, as existing security data for the current (second) power cycle by overwriting the existing security data that was stored to the UICC during the previous (first) power cycle,
wherein overwriting the security data, which was stored to the UICC as the previous security data during the previous (first) power cycle, renders data stored to the mobile communication device during the previous (first) power cycle inaccessible during a next (third) power cycle subsequent to the current (second) power cycle.

9. The mobile communication device of claim 8, wherein the existing security data comprises one or more of a key, a counter value, and a salt value.

10. The mobile communication device of claim 8, wherein the control unit is further configured to:
determine whether a personal identification number (PIN) code validation performed by the UICC is successful; and
read the existing security data from the UICC in response to determining that the PIN code validation performed by the UICC is successful.

11. The mobile communication device of claim 8, wherein to generate the new security data, the control unit is configured to cause the UICC to generate the new security data.

12. The mobile communication device of claim 11, wherein the control unit is configured to read the new security data generated during the current (second) power cycle from the UICC.

13. The mobile communication device of claim 8, wherein the control unit is further configured to:
read, from the UICC, the existing security data from the current (second) power cycle during a next (third) power cycle subsequent to the current (second) power cycle; and
utilize the existing security data from the current (second) power cycle to decrypt data that was stored on the storage unit during the current (second) power cycle.

14. A mobile communication device, comprising:
means for reading existing security data from a universal integrated circuit card (UICC) during a current (second) power cycle;
means for utilizing the existing security data to decrypt data stored to a mobile communication device during a previous (first) power cycle;
means for generating new security data during the current (second) power cycle;
means for utilizing the new security data to encrypt data stored to the mobile communication device during the current (second) power cycle;
means for causing the UICC to store the existing security data from the previous (first) power cycle as previous security data for the current (second) power cycle; and
means for causing the UICC to store the new security data, which is generated during the current (second) power cycle, as existing security data for the current (second) power cycle by overwriting the existing security data that was stored to the UICC during the previous (first) power cycle,
wherein overwriting the security data, which was stored to the UICC as the previous security data during the previous (first) power cycle, renders data stored to the mobile communication device during the previous (first) power cycle inaccessible during a next (third) power cycle subsequent to the current (second) power cycle.

15. A non-transitory computer readable medium having stored thereon instructions for causing one or more processors to perform operations comprising:
reading existing security data from a universal integrated circuit card (UICC) during a current (second) power cycle;
utilizing the existing security data to decrypt data stored to a mobile communication device during a previous (first) power cycle;
generating new security data during the current (second) power cycle;
utilizing the new security data to encrypt data stored to the mobile communication device during the current (second) power cycle;
causing the UICC to store the existing security data from the previous (first) power cycle as previous security data for the current (second) power cycle; and
causing the UICC to store the new security data, which is generated during the current (second) power cycle, as existing security data for the current (second) power cycle by overwriting the existing security data that was stored to the UICC during the previous (first) power cycle,
wherein overwriting the security data, which was stored to the UICC as the previous security data during the previous (first) power cycle, renders data stored to the mobile communication device during the previous (first) power cycle inaccessible during a next (third) power cycle subsequent to the current (second) power cycle.

* * * * *